(12) United States Patent
Curlier et al.

(10) Patent No.: US 10,215,055 B2
(45) Date of Patent: Feb. 26, 2019

(54) TRANSMISSION ASSEMBLY COMPRISING A TRANSMISSION MEMBER AND AN OIL DISTRIBUTION SYSTEM

(71) Applicant: SAFRAN AIRCRAFT ENGINES, Paris (FR)

(72) Inventors: Augustin Curlier, La Bertrand (FR); Yassine Krid, Garges-les-Gonesse (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 297 days.

(21) Appl. No.: 15/128,708

(22) PCT Filed: Mar. 19, 2015

(86) PCT No.: PCT/FR2015/050669
§ 371 (c)(1),
(2) Date: Sep. 23, 2016

(87) PCT Pub. No.: WO2015/145029
PCT Pub. Date: Oct. 1, 2015

(65) Prior Publication Data
US 2018/0216489 A1    Aug. 2, 2018

(30) Foreign Application Priority Data
Mar. 24, 2014   (FR) ..................... 14 52462

(51) Int. Cl.
*F02C 7/36* (2006.01)
*F01D 25/20* (2006.01)
(Continued)

(52) U.S. Cl.
CPC ............ *F01D 25/20* (2013.01); *F01D 25/18* (2013.01); *F02C 7/36* (2013.01); *F16H 57/0435* (2013.01);
(Continued)

(58) Field of Classification Search
None
See application file for complete search history.

(56) References Cited

U.S. PATENT DOCUMENTS

| 4,772,181 A | 9/1988 | Poucher |
| 6,223,616 B1 * | 5/2001 | Sheridan ............... F16H 1/2827 184/6.12 |

(Continued)

FOREIGN PATENT DOCUMENTS

| CN | 1924404 A | 3/2007 |
| EP | 2 559 913 A1 | 2/2013 |

(Continued)

OTHER PUBLICATIONS

International Search Report dated Jun. 10, 2015 in PCT/FR15/50669 filed Mar. 19, 2015.
(Continued)

*Primary Examiner* — Dirk Wright
(74) *Attorney, Agent, or Firm* — Oblon, McClelland, Maier & Neustadt, L.L.P.

(57) ABSTRACT

A transmission assembly including a transmission member and an oil distribution system. The transmission member includes a rotary pivot, and a pivot portion for pivoting about the rotary pivot; the oil distribution system is to receive oil feed and to transfer it to an oil reception chamber of the rotary pivot; the rotary pivot includes injection orifices putting the oil reception chamber into fluid flow communication with the gap between the rotary pivot and the pivot portion to form a fluid bearing; and the transmission assembly is for injecting oil into the gap at a first pressure into an outer portion of the gap, and at a second pressure into an inner portion of the gap, the second injection pressure being different from the first injection pressure.

10 Claims, 5 Drawing Sheets

(51) Int. Cl.
*F01D 25/18* (2006.01)
*F16H 57/04* (2010.01)

(52) U.S. Cl.
CPC ..... *F16H 57/0441* (2013.01); *F16H 57/0456* (2013.01); *F16H 57/0479* (2013.01); *F16H 57/0486* (2013.01); *F05D 2260/40311* (2013.01); *F05D 2260/53* (2013.01); *F05D 2260/98* (2013.01); *F05D 2270/301* (2013.01)

(56) References Cited

U.S. PATENT DOCUMENTS

| | | | | |
|---|---|---|---|---|
| 8,777,792 | B2* | 7/2014 | Imai | F16H 57/0409 475/159 |
| 8,813,469 | B2* | 8/2014 | Sheridan | F01D 25/16 184/6.12 |
| 9,476,321 | B2* | 10/2016 | Haugh | F02C 7/14 |
| 2012/0157256 | A1 | 6/2012 | Takeuchi et al. | |
| 2013/0102432 | A1 | 4/2013 | Imai et al. | |

FOREIGN PATENT DOCUMENTS

| | | |
|---|---|---|
| EP | 2 834 503 A1 | 2/2015 |
| FR | 2 987 402 A1 | 8/2013 |
| FR | 2 987 417 A1 | 8/2013 |
| GB | 2 209 371 A | 5/1989 |
| JP | 58-67161 U | 5/1983 |
| WO | WO 2013/124590 A1 | 8/2013 |

OTHER PUBLICATIONS

Combined Office Action and Search Report dated May 18, 2018 in Chinese Patent Application No. 201580022644.3 (submitting English language translation only), 6 pages.

* cited by examiner

TRANSMISSION ASSEMBLY COMPRISING A TRANSMISSION MEMBER AND AN OIL DISTRIBUTION SYSTEM

FIELD OF THE INVENTION

The present description relates to a transmission assembly comprising a transmission member and an oil distribution system for supplying the transmission member with oil in order to lubricate it.

Such a transmission assembly may be used in particular in the field of aviation, within airplane turbojets or helicopter turboshaft engines, to mention but these examples.

STATE OF THE PRIOR ART

The turbojets that are conventionally encountered these days in the field of civil aviation are two-spool bypass turbojets. Nevertheless, given the ever increasing constraints on operating costs, closely tied to the cost of fuel, which is nowadays very high, new projects have been proposed for turbojets that benefit from lower specific consumption.

A promising option consists in fitting the turbojet with a speed-reduction gearing interposed between the low pressure compressor and the fan: in this way, it is possible to increase the speed of rotation of the low pressure spool, thereby increasing the overall efficiency of the turbojet, while reducing the speed of the fan, thereby enabling the diameter of the fan to be increased, and thus enabling the bypass ratio of the engine to be increased, while conserving a peripheral speed at the tips of the fan blades that is acceptable for limiting the appearance of aerodynamic disturbances that generate noise in particular.

Figure 1:
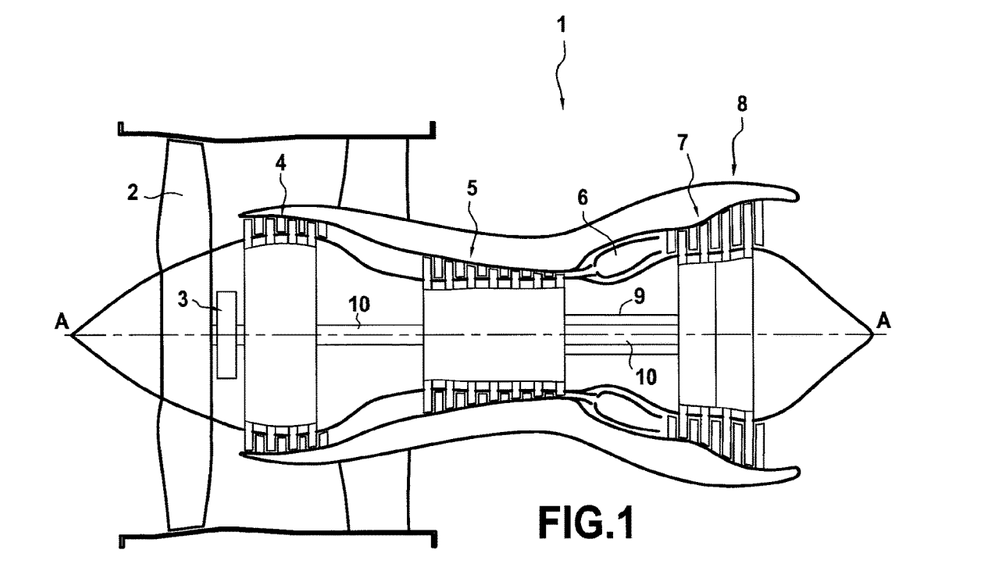
FIG. 1 is an axial section view of an example of a turbine engine with gearing.

One such bypass turbojet with speed-reduction gearing is shown in FIG. 1, in section on a vertical plane containing its main axis A. From upstream to downstream, it comprises a fan 2, speed-reduction gearing 3, a low pressure compressor 4, a high pressure compressor 5, a combustion chamber 6, a high pressure turbine 7, and a low pressure turbine 8.

In such a turbojet with gearing 1, the high pressure turbine 7 drives the high pressure compressor 5 via a high pressure shaft 9. The low pressure turbine 8, also referred to as a "fast" turbine, drives the low pressure compressor 4, also referred to as a "fast" compressor, via a low pressure shaft 10. The fast turbine 8 also drives the fan 2 via the speed-reduction gearing 3. In this way, the fan 2 can be driven at low speed, which is favorable from an aerodynamic point of view, while the low pressure compressor 4 can be driven at a higher speed, which is favorable from a thermodynamic point of view.

Figure 2A:
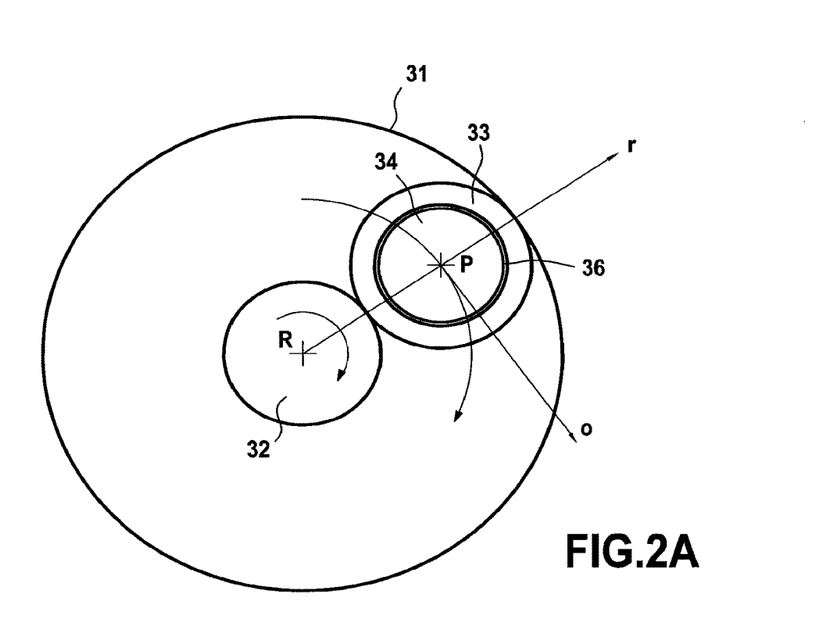
FIG. 2A is a diagram of the stroke of the planet gear.

As shown in FIG. 2A, the gearing 3 may be an epicyclic gear train having a ring 31, a sun gear 32, and planet gears 33 (only one planet gear 33 is shown in the figure for simplification purposes). The planet gears 33 are mounted to rotate on spindles 34 of a planet carrier: each planet gear 33 thus pivots about the pivot axis P of its respective spindle 34. The bearings 36 between the planet gears 33 and their respective spindles 34 may be smooth, i.e. without any rolling bearings, in which case they have a film of oil under pressure for lubrication and cooling the bearings 36. An example of an oil distribution system is described in the French patent application filed under the number 13/58581.

In a conventional configuration, the ring 31 is fastened to the casing 40, the planet carrier 35 is coupled to the fan shaft 2a, driving the fan 2, and the sun gear 32 is coupled to one end 10a of the low pressure shaft 10.

While the engine is in operation, given that the sun gear 32 is rotating and the ring 31 is stationary, the planet gears 33 follow a path that superposes rotation about the axis of rotation R of the epicyclic gear train with pivoting about the pivot axes P of their respective spindles 34: under such circumstances, the spindles 34 and the planet carrier 35 as a whole are driven in rotation about the axis of rotation R of the epicyclic gear train.

Figure 2B:
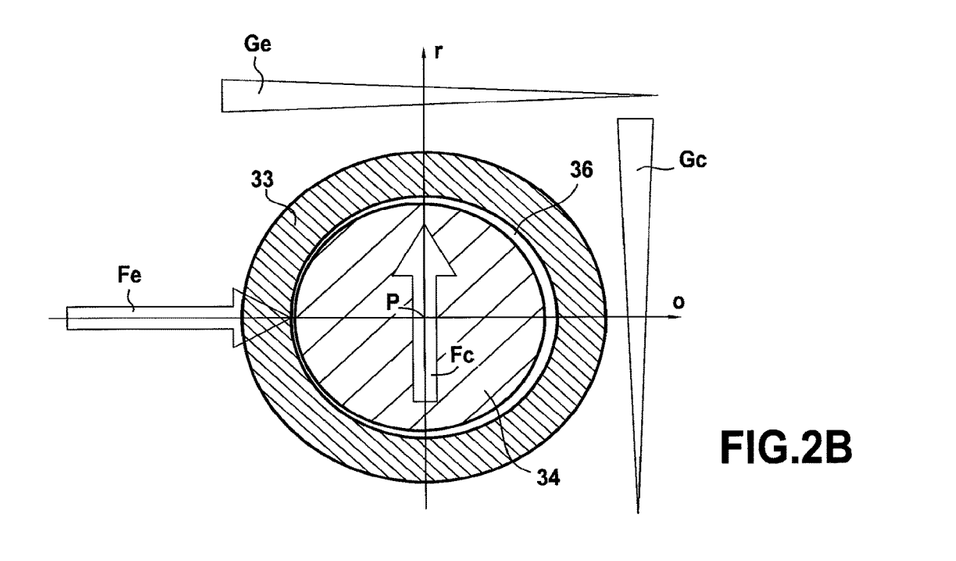
FIG. 2B is a diagram showing the forces acting on the bearing of the planet gear.

FIG. 2B is a diagram showing the forces that are then exerted on the oil film present in the gap within the bearing 36 of such a planet gear 33 under conventional circumstances. Firstly, the planet gear 33 exerts a drive force Fe on the oil film which is transferred to the spindle 34 and which tends to drive the planet carrier in rotation about the axis of rotation R: in the rotating reference frame [r, o, P] tied to the spindle 34, this drive force Fe is circumferential. This drive force pinches the oil film, between the spindle 34 in the circumferential direction, thereby leading to extra pressure in this pinched zone and causing a circumferential drive gradient Ge to appear in this oil film, which gradient increases rearwards.

Furthermore, because the spindle 34 is rotating about the axis of rotation R, the oil film in the gap 36 is subjected to a centrifugal force Fc that is proportional to the square of the speed of rotation about the axis of rotation R and that is directed radially in the rotating reference frame [r, o, P] tied to the spindle 34. Centrifugal volume forces then generate a radial centrifugal gradient Gc in the oil film, which gradient increases outwards.

Finally, gravity force also acts on the oil film, however its influence is negligible compared with the drive force Fe and the centrifugal force Fc while the gearing is in operation.

Figure 3:
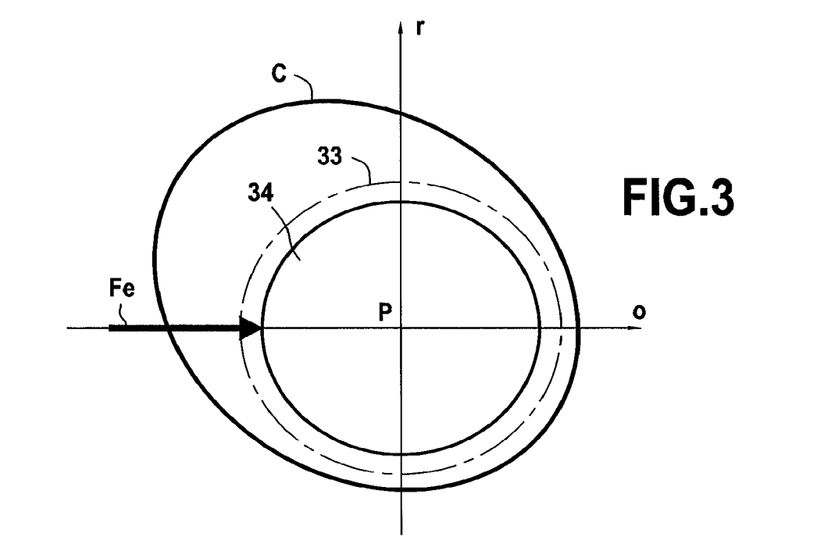
FIG. 3 is a diagrammatic graph showing the distribution of the pressure field in the bearing in the absence of compensation.

In such a conventional configuration, the drive gradient and the centrifugal gradient are superposed, thereby giving the pressure field a distribution that is shown diagrammatically in FIG. 3. In such a graph, for a given angular coordinate, the further the curve C is away from the center of the reference frame, the greater the pressure that exists in the segment of gap under consideration.

It can thus be seen that the pressure field C is unbalanced relative to the circumferential drive direction. Under such circumstances, firstly the transmission of drive forces from the planet carrier 33 to the spindle 34 is degraded; and secondly this increases the risk of the planet gear 33 coming into contact with its spindle 34, and thus damaging the bearing.

In order to remedy that phenomenon, gearing assemblies have been proposed in which the planet carrier is the member of the gearing that is tied to the casing: under such circumstances, no centrifugal force applies to the oil film of the planet carrier bearing. Nevertheless, that configuration in which it is the planet carrier rather than the ring of the gearing that is tied to the casing imposes a range of speed-reduction ratios that are unsuitable for certain engine models.

There thus exists a real need for a transmission assembly that does not suffer, at least in part, from the above-mentioned drawbacks inherent to known configurations.

SUMMARY OF THE INVENTION

The present description provides a transmission assembly comprising a transmission member and an oil distribution system housed in a casing having at least one oil feed; wherein the transmission member includes at least one rotary pivot suitable for turning about an axis of rotation, and a pivot portion suitable for pivoting about the rotary pivot; wherein the oil distribution system is configured to receive oil under pressure from the oil feed and to transfer it to at least one oil reception chamber of the rotary pivot; wherein said rotary pivot includes injection orifices putting the oil reception chamber into fluid flow communication with the gap between the rotary pivot and the pivot portion so as to form a fluid bearing; and wherein the transmission assembly is suitable for injecting oil into said gap at a first injection pressure into an outer portion of the gap facing away from the axis of rotation, and at a second injection pressure into an inner portion of the gap facing towards the axis of rotation, the second injection pressure being different from the first injection pressure.

In such a fluid bearing, given that the rotary pivot is rotating about the axis of rotation, the oil film in the gap is subjected to centrifugal volume forces that generate a centrifugal pressure gradient in which the pressure of the oil situated in the outer portion of the gap, and thus at a greater radial distance from the axis of rotation, is greater than the pressure of the oil situated in the inner portion of the gap, and thus at a smaller radial distance from the axis of rotation.

By means of the present transmission assembly that enables oil to be injected at different pressures into the inner and outer portions of the gap, it is possible to introduce an injection pressure differential in the oil film of the bearing fluid in order to compensate the centrifugal pressure gradient, at least in part. Nevertheless, each of these pressures remains greater than atmospheric pressure.

Thus, by means of this transmission assembly, it is possible to adjust the distribution of the pressure field in the oil film, at least in part, so as to have better control over the position of the pivot portion about the rotary pivot. Firstly, this serves to reduce the risk of contact between the pivot portion and the rotary pivot, thereby reducing wear in the transmission member. Furthermore, this serves to improve the symmetry of the pressure field around the drive direction in which the drive force is applied as exerted by the pivot part on the rotary pivot or vice versa, thereby improving the efficiency with which energy is transferred between these two members, and thus improving the general performance of the transmission member.

In the present description, the terms "axial", "radial", "tangential", "inner", "outer", and their derivatives are defined relative to the main axis of the transmission assembly; the term "circumferential" is defined about the main axis. Furthermore, the term "inner portion of the gap" designates a portion of the gap at an angular amplitude lying in the range 10° to 180°, preferably in the range 10° to 90° that extends symmetrically on either side of a radial plane containing the axis of rotation and the pivot axis and situated in the inner half-space defined by the circumferential plane perpendicular to said radial plane and containing the axis of the rotary pivot. The term "outer portion of the gap" is used to mean the portion of the gap that corresponds to the outer half-space defined by the circumferential plane.

In certain embodiments, the second injection pressure is greater than the first injection pressure. This introduces a centripetal injection pressure differential serving to compensate, at least in part, the centrifugal pressure gradient that is generated by the centrifugal volume forces.

In certain embodiments, the transmission assembly comprises both a first oil flow path opening via at least one first injection orifice into the outer portion of the gap, and a second oil flow path, distinct from the first oil flow path, opening via at least one second injection orifice into the inner portion of the gap. Because of the independence between the first and second oil flow paths, it is possible to adjust the injection parameters independently, and in particular the pressure at which oil is injected into the outer portion of the gap and the pressure at which oil is injected into the inner portion of the gap.

In certain embodiments, the transmission device further includes a computer configured to adjust the pressure of the first and/or second fluid flow paths as a function of the speed of rotation of the rotary pivot about the axis of rotation. The centrifugal force acting on the oil film, and thus the amplitude of the centrifugal pressure gradient, increases with increasing speed of rotation of the rotary pivot about the axis of rotation: such a computer thus makes it possible to compensate for this increase by increasing correspondingly the injection pressure differential. This injection pressure difference can thus be zero when the speed of rotation of the rotary pivot is zero and it can increase as the speed increases.

In certain embodiments, the transmission assembly includes a device for measuring the speed of rotation of the rotary pivot about the axis of rotation.

In certain embodiments, the measurement device comprises a phonic wheel.

In certain embodiments, the computer is configured to apply a control relationship whereby the pressure difference between the first and second injection pressures compensates at least 70% of the oil pressure difference between the inner and outer portions of the gap as caused by centrifugal volume forces during rotation of the rotary pivot. In this way, the distribution of the pressure field is brought significantly closer to the ideal situation in which the pressure field is symmetrical about the drive direction. The performance of the transmission member is thus greatly improved.

In certain embodiments, the computer is configured to apply a control relationship whereby the pressure difference between the first and second pressures serves to guarantee that the oil film has a thickness that is not less than 1.5 times greater than the equivalent roughness of the bodies of the bearing (in the least mean square sense).

In certain embodiments, the assembly has a first oil feed put under pressure by a first pump and feeding the first flow path, and a second oil feed put under pressure by a second pump and feeding the second oil flow path. By means of these independent feeds, it is possible to adjust the parameters specific to each oil flow path upstream, thereby simplifying the configuration of the distribution system. In particular, the two pumps can act independently to adjust the pressure in each of the oil flow paths.

In certain embodiments, the oil distribution system comprises a rotary portion having a first oil transfer chamber provided with at least one first feed orifice configured to receive oil from the first oil feed, and a second oil transfer chamber provided with at least one second feed orifice configured to receive oil from the second oil feed.

In certain embodiments, the rotary pivot includes a first oil reception chamber in fluid flow communication with the outer portion of the gap via at least one first injection orifice, and a second oil reception chamber in fluid flow communication with the inner portion of the gap via said at least one second injection orifice.

In certain embodiments, the assembly further comprises a first connection duct putting the first oil transfer chamber into fluid flow communication with the first oil reception chamber, and a second connection duct putting the second oil transfer chamber into fluid flow communication with the second oil reception chamber.

In certain embodiments, the first and second connection ducts are independent.

In other embodiments, the first and second connection ducts form portions of a single part having two channels.

In certain embodiments, the oil distribution system is driven to rotate together with the rotary pivot of the transmission member.

In the present description, the term "the oil distribution system is driven to rotate together with the rotary pivot of the transmission member" is used to mean that the oil distribution system rotates about the axis of rotation at substantially the same speed, and in any event on average at the same speed, as the rotary pivot of the transmission member and with a phase difference that remains substantially zero, and is in any event zero on average, in such a manner that a given point of the oil transmission system is always substantially facing the same zone of the rotary pivot of the transmission member. This definition thus accommodates small transient speed differences or small transient phase differences due to interfering vibration, or in the event of the rotary pivot of the transmission member accelerating or decelerating, for example.

In certain embodiments, at least one oil transfer chamber of the oil distribution system extends over an angular sector that is strictly less than 360°. In this way, the oil transfer chamber is not continuous around a complete turn of the oil distribution system, thereby preventing the oil from rotating within the oil transfer system, and thus limiting the impact of oil movements on the overall dynamics of the oil distribution system. In this way, the oil remains in the same reference frame as the distribution system.

In certain embodiments, the oil distribution system is connected to the rotary pivot of the transmission member via at least one rotary drive device including a damper. This rotary drive device with a damper serves to drive the oil distribution system in rotation while limiting transmission of interfering movements from the transmission member to the oil distribution system. Embodiments of such drive devices are described in the French patent application filed under the number 13/58581.

In certain embodiments, the rotary pivot has a plurality of first injection orifices arranged symmetrically on either side of the plane containing the pivot axis of the rotary pivot and the axis of rotation of the rotary pivot.

In certain embodiments, the rotary pivot has a plurality of second injection orifices arranged symmetrically on either side of the plane containing the axis of the rotary pivot and the axis about which the rotary pivot rotates. In this way, injection is distributed symmetrically relative to the radial direction of the rotary reference frame, which is better adapted for compensating centrifugal gradient, which is likewise symmetrical relative to this radial direction.

In certain embodiments, the rotary pivot has an even number of first injection orifices.

In certain embodiments, the rotary pivot has an even number of second injection orifices. Specifically, it is preferable not to inject oil along the radial direction of the rotary reference frame, whether injection is towards the axis of rotation or away from it.

In certain embodiments, the rotary pivot has at least one group of two first injection orifices that are spaced apart by an angle lying in the range 10° to 160°, preferably in the range 60° to 120°, and more preferably equal to 90°±5° relative to the axis of the rotary pivot.

In certain embodiments, the rotary pivot has at least one group of two second injection orifices separated by an angle lying in the range 10° to 160°, preferably in the range 60° to 120°, more preferably equal to 90°±5° relative to the axis of the rotary pivot.

In certain embodiments, the rotary pivot has a plurality of groups of first injection orifices, preferably two groups.

In certain embodiments, the rotary pivot has a plurality of groups of second injection orifices, preferably two groups.

In certain embodiments, the first injection orifices are provided symmetrically relative to the second injection orifices.

In certain embodiments, the rotary pivot includes injection orifices possessing flow sections that are different. This makes it possible to generate different head losses during injection and thus to set different injection pressures. This constitutes alternative or additional means for generating the injection pressure difference in the oil film in the gap. In particular, under such circumstances, it is possible to provide a single oil flow path feeding the injection orifices and presenting larger flow sections for the inner portion of the gap compared with its outer portion.

In certain embodiments, the bearing between the pivot portion and the rotary pivot does not have a rolling bearing.

In certain embodiments, the transmission member is speed-reduction gearing.

In certain embodiments, the transmission member is of the epicyclic gear train type including a planet carrier.

In certain embodiments, the planet carrier possesses a plurality of spindles constituting rotary pivots, each carrying a planet gear forming a pivot portion. The centrifugal pressure gradient can thus be compensated, at least in part, in the bearings of each of the planet gears of the epicyclic gear train.

The present description also provides a turbine engine including a transmission assembly in accordance with any of the above embodiments.

In certain embodiments, the turbine engine also includes a low pressure turbine and a fan, and the epicyclic gear train further includes a sun gear and a ring.

In certain embodiments, the ring is fastened to the casing, preferably via a flexible connection, the sun gear is coupled to the low pressure turbine, preferably via a flexible connection, and the planet carrier is coupled to the fan, preferably via a stiff connection. The term "flexible connection" is used to designate a connection that is more flexible in bending than a connection that is said to be "stiff".

The above-specified characteristics and advantages, and others, appear on reading the following detailed description of embodiments of the proposed device and method. This detailed description is given with reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of elements) that are identical are identified by the same reference sign.

DETAILED DESCRIPTION OF EMBODIMENT(S)

In order to make the invention more concrete, an example transmission assembly is described in detail below with reference to the accompanying drawings. It should be recalled that the invention is not limited to this example.

FIG. 1 shows a bypass turbojet with gearing as described in the introduction and including a transmission assembly 3 of the invention.

Figure 5:
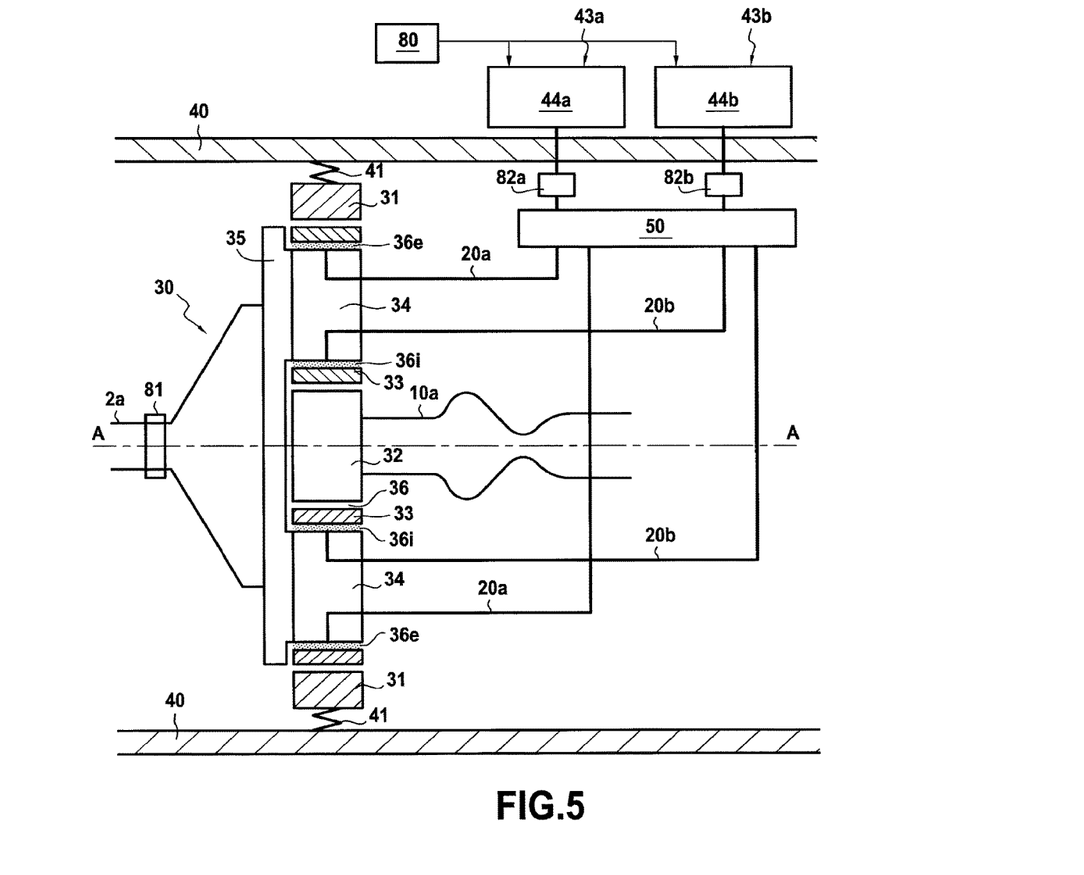
FIG. 5 is a schematic diagram of the transmission assembly.

The transmission assembly 3 comprises an epicyclic gear train 30 analogous to that described in the introduction with reference to FIG. 2A. The transmission assembly 3 of the invention is also shown in FIG. 5.

It should be observed in particular that in this example the ring 31 is fastened to the casing 40 by flexible shrouds 41, the planet carrier 35 is coupled to the fan shaft 2a that drives the fan 2 via a rigid connection, and the planet gear 32 is coupled flexibly to a fluted end 10a of the low pressure shaft 10.

In this embodiment of the invention, each spindle 34 of the planet gears 33 has a first oil reception chamber 37a and a second oil reception chamber 37b that are in fluid flow connection respectively with the outer portion 36e of the gap 36 forming the bearing, and with the inner portion 36i of the gap 36 of the bearing, via channels passing through the spindle 34 and opening out respectively via first and second injection orifices 38a and 38b.

Figures 6, 7:
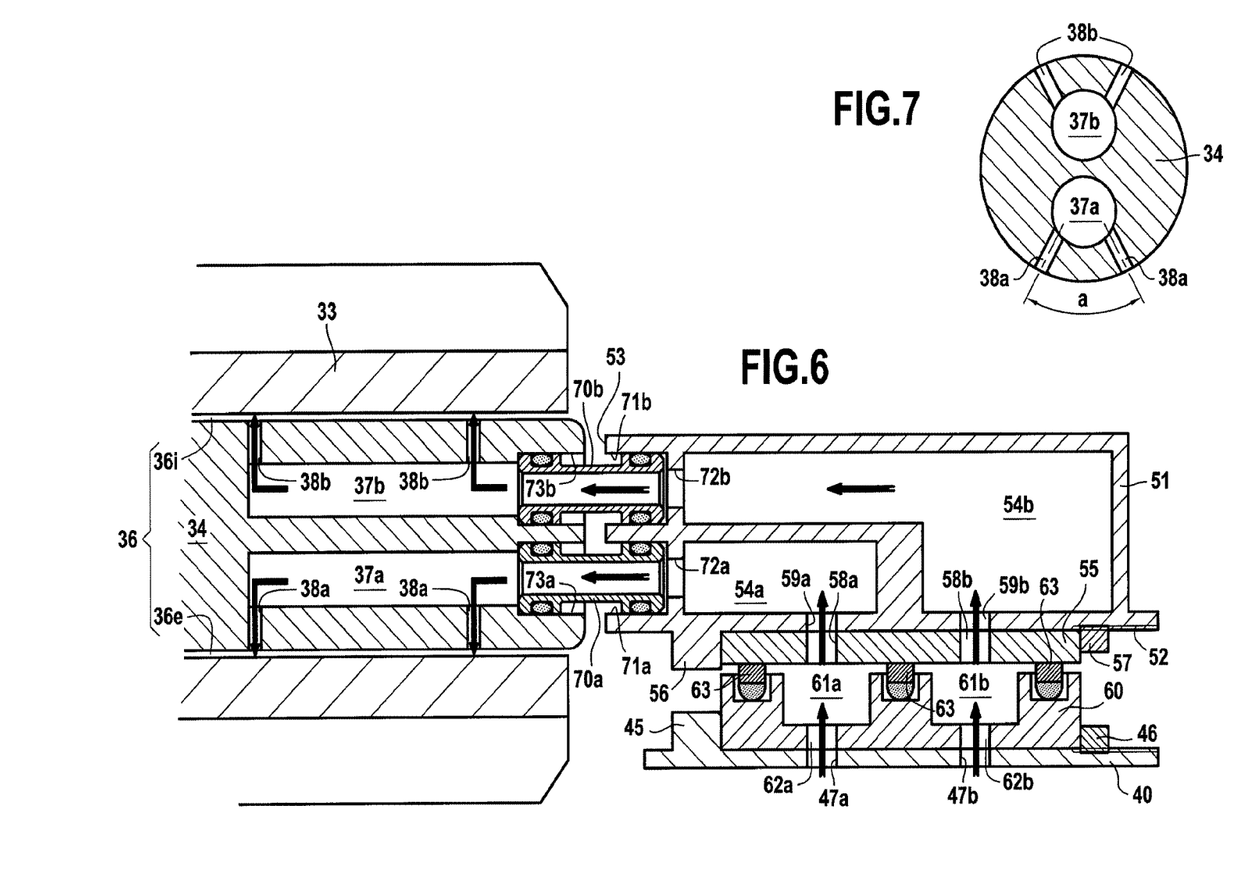
FIG. 6 is a section view of the oil distribution system.
FIG. 7 is a cross-section view of a spindle.

In one example of the distribution of the injection orifices 38a and 38b around the spindle 34, as can be seen more clearly in FIGS. 6 and 7, the spindle 34 has a first series of first injection orifices 38a situated in a first axial frame and a second series of first injection orifices 38a situated in a second axial plane. In addition, each series of first orifices 38a has two first orifices 38a arranged symmetrically on either side of the radial plane and spaced apart by an angle a of about 90°. In this example of injection orifice distribution, the second injection orifices 38b are provided in a configuration that is analogous, but symmetrical to the first orifices 38a about the circumferential plane.

The transmission assembly 3 also has an oil distribution system 50 for distributing lubricating oil from a first oil feed 43a that is supplied by a first pump 44a, and a second oil feed 43b that is supplied by a second pump 44b, the system extending to the bearings 36 of the planet gears 33. These two feeds 43a and 43b together with their pumps 44a and 44b are provided on the stator of the speed-reduction assembly 3.

The distribution system 50 is described in greater detail with reference to FIG. 6.

The oil distribution system 50 comprises firstly a rotary portion 51 of generally annular shape having a cylindrical outer wall 52 and a front wall 53. The rotary portion has a first oil transfer chamber 54a occupying a circular arc with an angular sector of less than 360° inside and along the front portion of the outer wall 52 and along a major fraction of the outer portion of the front wall 53. The rotary portion 51 also has a second oil transfer chamber 54b with an L-shaped profile in cross-section surrounding the first transfer chamber 54a: it is thus contiguous with the rear portion of the outer wall 52 and with the inner portion of the front wall 53. The second transfer chamber 54b also extends over an angular sector of less than 360°, and preferably over the same angular sector as the first transfer chamber 54a.

An annular band 55 is fitted around the outer wall 52 between a shoulder 54 and a nut 57. The band 55 has first and second series of admission passages 58a and 58b, respectively, that face respective admission orifices 59a and 59b formed in the outer wall 52 and leading respectively into the first transfer chamber 54a and the second transfer chamber 54b.

Thereafter, the oil distribution system 50 has a generally annular stationary portion 60 mounted against the casing 40 between a shoulder 45 and a nut 46. The stationary portion 60 has a first annular cavity 61a and a second annular cavity 61b, both of which are open in their radially inner sides facing the band 55 of the portion 51. The first and second cavities 61a and 61b have respective orifices 62a and 62b in their radially outer sides that face respective feed orifices 47a and 47b coming from the first and second oil feeds 43a and 43b respectively.

The rotary portion 51 of the oil distribution system 50 is mounted on the planet carrier 35 by a plurality of rotary drive devices (not shown), possibly including dampers. Embodiments of such drive devices are described in the French patent application filed under the number 13/58581.

The rotary portion 51 is also mounted in the casing 40 by engaging its band 55 in the stationary portion 60 of the oil distribution system, thereby closing the first and second cavities 61a and 61b. Angular gaskets 63 are provided between the rotary portion 51 and the band 55 in front of the first cavity 61a, between the first and second cavities 61a and 61b, and behind the second cavity 61b in order to seal the cavities 61a and 61b. These gaskets 63 are preferably composites, each including an elastomer pre-clamping inner element of the O-ring type and a ring type outer element comprising polytetrafluoroethylene (PTFE). An example of a gasket of this type is the Turcon Glyde Ring (registered trademark) gasket.

In order to transfer oil from a transfer chamber 54a, 54b to the corresponding oil reception chambers 37a, 37b of the spindles 34, the front wall 57 of the rotary portion 51 of the oil distribution system 50 has first and second setbacks 71a and 71b provided at locations that face the oil reception chambers 37a, 37b of the spindle 34 of the planet carrier 35. Each of these setbacks 71a, 71b is in fluid flow communication with the corresponding oil transfer chamber 54a, 54b via orifices 72a, 72b.

Each spindle 34 of the planet carrier 35 has first and second setbacks 73a, 73b in fluid flow communication with the oil reception chamber 37.

For each spindle 34, respective first and second connection ducts 70a and 70b are mounted floatingly firstly between the side walls of the first and second setbacks 73a and 73b respectively of the spindle 34, and secondly between the side walls of the first and second setbacks 71a and 71b respectively of the rotary portion 51 of the facing oil distribution system 50, thus enabling the oil reception chambers 37a and 37b of the spindle 34 to be in fluid flow connection with their respective oil distribution chambers 54a and 54b.

The gearing assembly 3 is thus provided with two distinct oil flow paths 20a and 20b. In the first oil flow path 20a, oil is fed by the first pump 44a and penetrates via the orifices 47a and 62a into the first annular cavity 61a of the stationary portion 50 of the oil distribution system 50, in which it spreads over 360°; the oil then passes through the passages 58a, 59a to fill the first oil transfer chamber 54a in turn; the oil can then be distributed via the first connection duct 70a to the first oil reception chamber 37a of the spindles 34, from which it is conveyed to the outer portions 36e of the bearing 36 via the first injection orifice 38a. The first oil flow path 20a is thus continuous from the first pump 44a of the first oil feed 43a to the first injection orifices 38a. It can thus be understood that insofar as this first oil flow path does not possess any interruption, in particular at the interface between the rotor and the stator, the first oil flow path 20a remains under pressure all the way to the injection orifices 38a, with this injection pressure remaining substantially the same as that imposed by the first pump 44a, ignoring head losses.

In analogous manner, in the second oil flow path 20b, the oil is fed by the second pump 44b and penetrates via the orifices 47b and 62b into the second annular cavity 61b of the stationary portion 60 of the oil distribution system 50 within which it spreads over 360°; the oil then passes through the passages 58b, 59b in order to fill the second oil transfer chamber 54b in turn; the oil can then be distributed via the second connection duct 70b to the second oil reception chambers 37b of the spindles 34 from which it is conveyed to the inner portions of the bearings 36 via the second injection orifices 38b. The second oil flow path 20b is thus likewise continuous from the second pump 44b of the second oil feed 43b all the way to the second injection orifices 38b. It can thus be understood that, insofar as the second oil flow path does not possess any interruption, in particular at the interface between the rotor and the stator, the second oil flow path 20b remains under pressure all the way to the injection orifices 38b, with this injection pressure remaining substantially the same as that imposed by the second pump 44b, ignoring head losses.

The reduction assembly 3 also includes a computer 80 that controls the first and second pumps 44a and 44b in order to adjust the oil pressure in the first and second oil flow paths 20a and 20b. The reduction assembly 3 also has a device 81 for measuring the speed of rotation of the planet carrier 35; this measuring device comprises an inductive sensor and a phonic wheel mounted on the fan shaft 2a that is coupled to the planet carrier 35. Each time one of the teeth of the phonic wheel passes in front of the inductive sensor, it induces an electromotive force (emf) in the inductive sensor, thereby enabling the speed of rotation of the shaft 2a, and thus of the planet carrier 35, to be measured by analyzing the output signal from the sensor.

In order to compensate for the centrifugal pressure gradient Gc that is normally present in the oil film of the bearing 36 while the planet carrier 35 is rotating, the computer 80 adjusts the pressures of the first and second oil flow paths 20a and 20b so as to introduce an injection pressure differential between the first and second injection orifices 38a and 38b, i.e. between the outer and inner portions 36e and 36i of the bearing 36.

The computer 80 adjusts this injection pressure differential as a function of the speed of rotation as measured by the measurement device and in application of a suitable control relationship relying on a calibration table or on a mathematical model. Control also relies on a feedback loop based on measuring pressure in the first and second flow paths 20a and 20b, which is performed by pressure and/or flow rate sensors 82a and 82b.

Thus, the injection pressure differential is zero or almost zero when the reduction gearing is stationary and becomes increasingly large as the planet carrier rotates faster.

Figure 4:
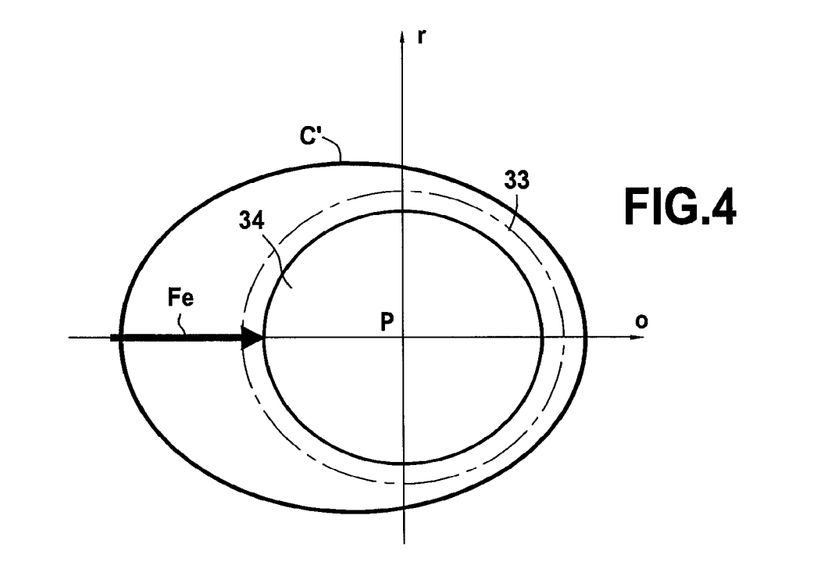
FIG. 4 is a diagrammatic graph showing the ideal distribution for the pressure field in the bearing.

By means of such a transmission assembly and such a control relationship, it is possible substantially to compensate the centrifugal pressure gradient Gc, thus making it possible to obtain a pressure field distribution close to the ideal distribution shown in FIG. 4, where the distribution of the pressure field C' is symmetrical about the circumferential plane, i.e. relative to the drive direction.

The embodiments or implementations described in the present description are given by way of non-limiting illustration, with it being easy in the light of this description for a person skilled in the art to modify those embodiments or implementations, or to envisage others, while remaining within the ambit of the invention.

Furthermore, the various characteristics of these embodiments or implementations may be used singly or in combination. When they are combined, these characteristics may be combined as described above or in other ways, the invention not being limited to the specific combination described in the present description. In particular, unless specified to the contrary, any characteristic described with reference to one particular embodiment or implementation may be applied in analogous manner to any other embodiment or implementation.

The invention claimed is:

1. A transmission assembly comprising a transmission member and an oil distribution system suitable to be housed in a casing having at least one oil feed;
   wherein the transmission member includes at least one rotary pivot suitable for turning about an axis of rotation, and a pivot portion suitable for pivoting about the rotary pivot;
   wherein the oil distribution system is configured to receive oil under pressure from the oil feed and to transfer it to at least one oil reception chamber of the rotary pivot;
   wherein said rotary pivot includes a first oil reception chamber in a fluid flow communication with an outer portion of a gap between the rotary pivot and the pivot portion facing away from the axis of rotation via at least one first injection orifice, and a second oil reception chamber, distinct from the first oil reception chamber, in fluid flow communication with an inner portion of the gap facing the axis of rotation via at least one second injection orifice, so as to form a fluid bearing; and
   wherein the transmission assembly is suitable for injecting oil into said gap at a first injection pressure into the outer portion of the gap, and at a second injection pressure into the inner portion of the gap facing towards the axis of rotation, the second injection pressure being different from the first injection pressure, the transmission assembly comprising both a first oil flow path opening via at least the first injection orifice into the outer portion of the gap, and a second oil flow path, distinct from the first oil flow path, opening via at least the second injection orifice into the inner portion of the gap.

2. The assembly according to claim 1, wherein the second injection pressure is greater than the first injection pressure.

3. The assembly according to claim 1, further including a computer configured to adjust the pressure of the first and/or second fluid flow paths as a function of the speed of rotation of the rotary pivot about the axis of rotation.

4. The assembly according to claim 3, wherein the computer is configured to apply a control relationship whereby the pressure difference between the first and second injection pressures compensates at least 70% of the oil pressure difference between the inner and outer portions of the gap as caused by centrifugal volume forces during rotation of the rotary pivot.

5. The assembly according to claim 1, having a first oil feed put under pressure by a first pump and feeding the first flow path, and a second oil feed put under pressure by a second pump and feeding the second oil flow path.

6. The assembly according to claim 5, wherein the oil distribution system comprises a rotary portion having a first oil transfer chamber provided with at least one first feed orifice configured to receive oil from the first oil feed, and a second oil transfer chamber provided with at least one second feed orifice configured to receive oil from the second oil feed;

further comprising a first connection duct putting the first oil transfer chamber into fluid flow communication with the first oil reception chamber, and a second connection duct putting the second oil transfer chamber into fluid flow communication with the second oil reception chamber.

7. The assembly according to claim 1, wherein the rotary pivot has a plurality of first injection orifices arranged symmetrically on either side of a plane containing a pivot axis of the rotary pivot and the axis of rotation of the rotary pivot.

8. The assembly according to claim 1, wherein the rotary pivot includes injection orifices possessing flow sections that are different.

9. The assembly according to claim 1, wherein the transmission member is a speed-reduction gear having an epicyclic gear train including a planet carrier; and wherein said planet carrier possesses a plurality of spindles constituting rotary pivots, each carrying a planet gear forming a pivot portion.

10. A turbine engine including a transmission assembly according to claim 1.

* * * * *